(12) United States Patent
Cheiky et al.

(10) Patent No.: US 8,574,405 B1
(45) Date of Patent: Nov. 5, 2013

(54) SYSTEM FOR CONVEYING BIOMASS

(71) Applicants: Michael C. Cheiky, Thousand Oaks, CA (US); Richard J. Reis, Camarillo, CA (US); Leo E. Manzer, Wilmington, DE (US)

(72) Inventors: Michael C. Cheiky, Thousand Oaks, CA (US); Richard J. Reis, Camarillo, CA (US); Leo E. Manzer, Wilmington, DE (US)

(73) Assignee: Cool Planet Energy Systems, Inc., Camarillo, CA (US)

( * ) Notice: Subject to any disclaimer, the term of this patent is extended or adjusted under 35 U.S.C. 154(b) by 0 days.

(21) Appl. No.: 13/573,739

(22) Filed: Oct. 3, 2012

(51) Int. Cl.
*C10B 9/00* (2006.01)
(52) U.S. Cl.
USPC ............. 202/96; 202/117; 202/239; 202/270; 414/222.11; 414/221

(58) Field of Classification Search
USPC ........ 202/96, 117, 239, 270; 414/222.11, 221
See application file for complete search history.

(56) References Cited

U.S. PATENT DOCUMENTS

| | | | | |
|---|---|---|---|---|
| 5,899,659 A | * | 5/1999 | Beilsmith | 414/796.2 |
| 6,164,892 A | * | 12/2000 | Malloy et al. | 414/398 |
| 7,748,653 B2 | * | 7/2010 | Palm | 241/27 |
| 8,137,628 B2 | * | 3/2012 | Cheiky et al. | 422/109 |
| 8,143,464 B2 | * | 3/2012 | Cheiky et al. | 585/240 |
| 8,216,430 B2 | * | 7/2012 | Cheiky | 202/216 |

* cited by examiner

*Primary Examiner* — Nina Bhat
(74) *Attorney, Agent, or Firm* — Wilmer Cutler Pickering Hale and Dorr LLP

(57) ABSTRACT

A system is described for processing biomass through a pyrolysis chamber that utilizes revolving polygon platforms, a conveyor system, and an airlock for introducing or removing biomass into the pyrolysis chamber. Biomass can be introduced via a first revolving polygon platform, and biochar resulting from pyrolysis can be removed via a second revolving polygon platform.

19 Claims, 6 Drawing Sheets

SYSTEM FOR CONVEYING BIOMASS

FIELD OF THE INVENTION

This invention relates generally to a system for feeding biomass to a pyrolysis reactor.

DESCRIPTION OF THE RELATED ART

With increasing economic costs of petroleum fossil fuels, it is desirable to find suitable substitutes for these fossil fuels. Intensive research has been focused on renewable sources of energy as a substitute, in particular biomass-derived sources. Biomass utilization typically involves pyrolysis of the biomass in an oxygen-deprived atmosphere under some pressure that may be different from atmospheric pressure, in order to avoid complete combustion of the biomass to carbon dioxide and to facilitate removal of evolved components. Numerous systems exist for introducing and conveying biomass into and out of pyrolysis chambers, particularly chambers maintained at different atmospheric conditions than the biomass.

U.S. Pat. No. 7,976,259 discloses a system for feeding biomass into a pressurized vessel. The system comprises a screw-feeding housing, a drive motor, a rotary airlock, a first conveyor screw, a second conveyor screw, a barrel within the screw-feeding housing, a low friction liner inside the barrel, a pressure sensor for monitoring backpressure, a compression disk for compressing biomass, an actuator connected to the compression disk, and circuitry to control a function controller, actuator, drive motor and pressure sensor. The rotary airlock separates entering biomass at atmospheric pressure from exiting biomass at pressures over two atmospheres. U.S. Pat. No. 7,007,616 discloses a combustion method in which biomass is fed into a combustion chamber through an airlock, wherein said combustion chamber receives a supply of oxygen and a gas diluent such as carbon dioxide.

U.S. Pat. No. 7,942,943 teaches a down-draft fixed bed gasifier in which biomass is fed via a variable speed auger to an airlock that comprises at least two sliding gate valves. Heat from the combustion chamber heats a tar removing catalyst located in the combustion area region. Air flow into the combustion chamber can be positive or negative.

U.S. Pat. No. 4,648,328 discloses an apparatus for pyrolysis of vehicular tires comprising a chain and flight conveyor and an airlock mechanism. U.S. Pat. No. 6,615,748 teaches a portable apparatus for the gasification of cellulose comprising pyrolysis in a downdraft gasifier. The pyrolysis produces a gas that is fed to an internal combustion engine, and the vacuum produced during the operation of the internal combustion engine is used to direct the movement of gases.

U.S. Pat. No. 7,906,695 describes a gasifier for decomposing waste materials comprising a reactor with a conical lower portion wherein material is fed continuously through an airlock and falls by gravity to the lower portion. The airlock system is comprised of two gates that are operated sequentially to allow material to be deposited in the combustion chamber. U.S. Pat. No. 7,452,392 teaches another gravity system which utilizes a feeder comprising an airlock in which biomass or other organic material is subjected to pyrolysis and gasification in one updraft chamber. Heat is supplied for the gasification by external burners. U.S. Pat. No. 7,763,219 describes a pyrolysis system performed on 55-gallon drums where the drums are introduced via an airlock system, while U.S. Pat. No. 7,658,155 describes a method for treating waste feedstock that uses a gasification system in conjunction with a plasma treatment. The plasma treatment is conducted in the presence of oxygen, and an airlock is used to introduce material and remove material from the reaction chambers.

The above-described conventional conveyor systems introduce biomass continuously to pyrolysis systems that process biomass in a continuous manner. Different systems exist for continuously moving material through a pyrolysis treatment during system operation. Typically, an inclined conveyor receives material from a storage bin and transports biomass from a ground location to a hopper located at a higher location, and dumps the biomass into a pyrolysis unit. Conveyor systems such as belt conveyors, cable belt conveyers, plastic belt conveyors, roller conveyors, lineshaft roller conveyors, gravity roller conveyor, gravity skatewheel conveyors, and belt driven live roller conveyor, are continuous in nature. Chain conveyors, drag chain conveyors, single or double strand chain, chain driven live roller conveyor, flexible conveyor, wire mesh conveyor, vibratory conveyor, bucket conveyors, screw conveyors and pneumatic conveyors, are also known to perform continuous conveyance of the biomass.

SUMMARY OF THE INVENTION

Various embodiments of the invention are directed toward a conveyor means for transporting biomass from air at atmospheric pressure to a pyrolysis chamber at a wide variety of different pressures under a wide variety of different environmental conditions. In some embodiments, the chamber pressure is positive (e.g., above one atmosphere) and the chamber atmosphere contains an inert gas such as carbon dioxide or nitrogen. In other embodiments, the chamber pressure is slightly negative while in other embodiments the chamber atmosphere contains oxygen at small concentrations. Some embodiments display a chamber pressure entirely under vacuum.

Other embodiments of the invention feature a semi-continuous dispensation of biomass into a revolving polygon platform, which in turn feeds biomass semi-continuously to a conveyor. The rate of dispensation controls the biomass throughput through the system. The biomass may be treated in a pyrolysis chamber such as one that decomposes biomass at increasing temperatures under the simultaneous application of pressure shocks. In an embodiment, the conveyor part of the system transports biomass through several distinct compartments where the biomass is subjected to treatments including drying, cooling, pyrolysis and solvent addition and removal.

Embodiments of the invention provide a unique feeder system that processes biomass in a batch fashion. The throughput of the biomass processing depends on the speed of batch processing, and not on the volume of material processed. This capability renders it suitable for installation in mobile equipment. The feeder system utilizes a combination of a revolving polygon platform and a conveyor system to move biomass along a pyrolysis chambers or biomass treatment chambers. The full nature of the invention will become evident from the following detailed description.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF EMBODIMENTS OF THE INVENTION

The following diagrams and description present examples of the invention, but in no way, limit the application of the above concepts. The following designs are simply illustrative of their application.

Embodiments of the invention utilize a unique conveyor system for the transportation of biomass into and out of a pyrolysis chamber. The conveyor system is particularly applicable for installation in mobile buildings such as trailers or mobile equipment such as trucks. In some implementations, the system is modular in design and adaptable for processing a variety of biomass. Conventional conveyor systems feed biomass to pyrolysis systems that process biomass in a continuous manner. Throughput is typically adjusted via conveyors that change speed and discharge load directly to a pyrolysis system. By contrast, embodiments of the invention provide a conveyor system that feeds biomass to a pyrolysis system in a batch manner. The present system comprises a means for conveying biomass through a pyrolysis chamber, whereby biomass is introduced via a first revolving polygon platform and biochar resulting from pyrolysis is removed via a second revolving polygon platform. The system also comprises a means for transferring biomass from the first revolving polygon platform onto the means for conveying, the means for conveying comprising a conveyor having a pyrolysis chamber as well as a means for transferring biochar from the conveyor to the second revolving polygon platform. The polygon platform may be n-sided, where n can vary from 3 to 1000.

Figure 1:
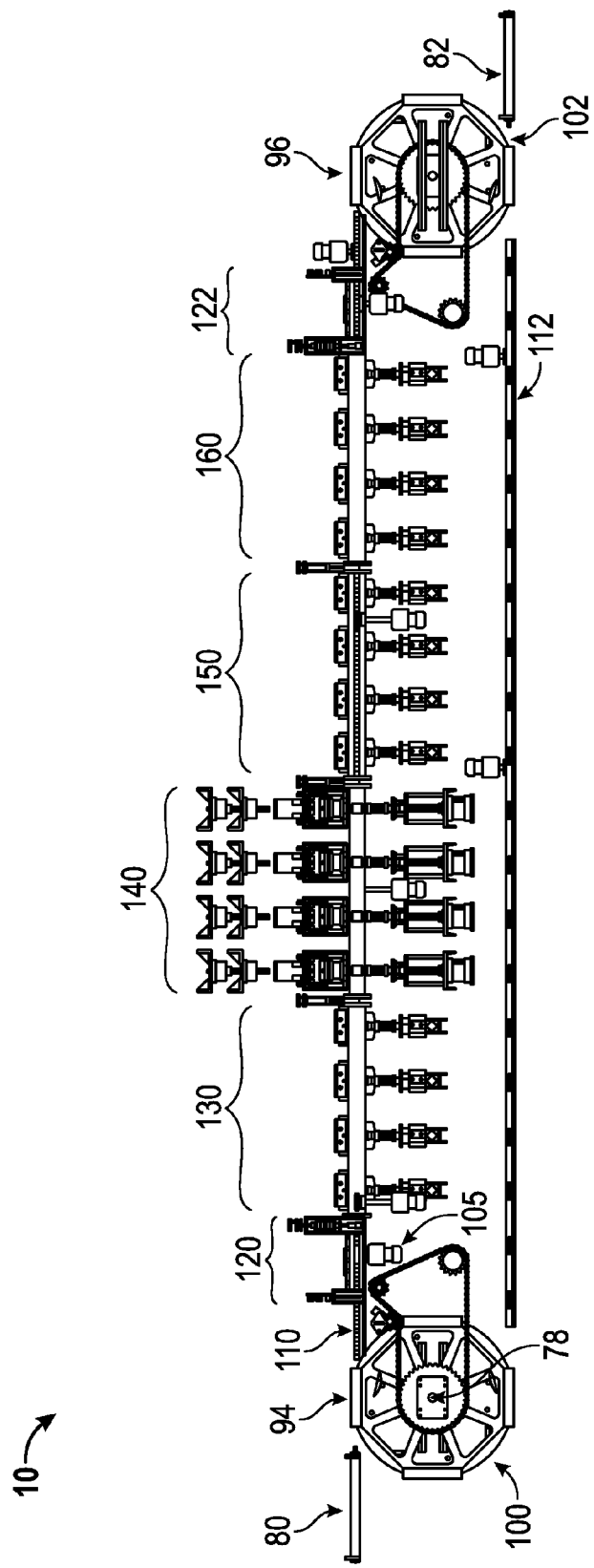
FIG. 1 is a diagram illustrating a system for conveying biomass in accordance with an embodiment of the invention.

FIG. 1 illustrates an embodiment of a system for conveying biomass, including the integration of various components into a biomass feeding system. Biomass is initially introduced into feeding system 10 via pallets 94 located on first revolving polygon platform 100. A polygon platform containing eight sides is illustrated. The platform is able to lock pallets in place as the polygon platform rotates about axis 78. When a pallet reaches the top horizontal position, a load of biomass is deposited onto the pallet. After the biomass is deposited, the pallet is pushed by mechanism 80 from the revolving polygon platform 100 onto conveyor 110. In another embodiment, the pallet is first pushed by mechanism 80, and then the pallet is loaded with biomass. Mechanism 80 can comprise, for example, an actuator with a mechanically extensible rod or a hydraulically driven bar capable of exerting sufficient force to disengage a pallet from the revolving polygon platform 100.

Once loaded onto the conveyor, a pallet is transported along the conveyor through a plurality of different compartments, which subject the biomass to separate treatments. Compartment 120 comprises a sliding gate airlock that serves to isolate the subsequent compartments from ambient conditions. Shown in FIG. 1 are compartments 130 which comprise a plurality of stations to dry the biomass, compartments 140 which pyrolyze the biomass, compartments 150 which remove residual gases, and compartments 160 which cool the biomass. These compartments can be modular for ready construction and disassembly. Pyrolyzed biomass exits via sliding gate airlock 122 to second revolving polygon platform 102, which is synchronized to receive pallet 96. As polygon platform 102 rotates about its axis, pallet 96 stays engaged to the polygon platform. As the pallet reaches a vertical position, biochar falls onto a conveyor or a receptacle capable of holding a large amount of the biochar. When the pallet reaches a bottom horizontal position, the pallet is pushed by mechanism 82 to bottom conveyor 112, which then transports the pallet for engagement at polygon platform 100.

Biomass, as used herein, includes any material derived or readily obtained from plant sources. Such material can include without limitation: (i) plant products such as bark, leaves, tree branches, tree stumps, hardwood chips, softwood chips, grape pumice, sugarcane bagasse, switchgrass; and (ii) pellet material such as grass, wood and hay pellets, crop products such as corn, wheat and kenaf. This term may also include seeds such as vegetable seeds, fruit seeds, and legume seeds.

The term 'biomass' can also include: (i) waste products including animal manure such as poultry derived waste; (ii) commercial or recycled material including plastic, paper, paper pulp, cardboard, sawdust, timber residue, wood shavings and cloth; (iii) municipal waste including sewage waste; (iv) agricultural waste such as coconut shells, pecan shells, almond shells, coffee grounds; and (v) agricultural feed products such as rice straw, wheat straw, rice hulls, corn stover, corn straw, and corn cobs.

The details of the biomass fractioning process, which takes place in compartments 140, are set forth in co-owned U.S. Pat. No. 8,216,430 titled "System and Method of Biomass Fractioning." The content of this application is incorporated herein by reference in its entirety. Briefly, thin sheets of biomass are subjected to a decomposition process that entails applying pressure shocks to the biomass while it is being subjected to ramps of temperature. The pressure shocks assure fractioning of cellulose walls and compress nascent partially carbonized particles within the biomass. This compression brings these carbon particles within a close enough contact to increase the electrical and thermal conductivity of particles. The pyrolysis of the particles is facilitated and accelerated at the higher temperatures in the ramp. The pressure shocks may be administered by any media that impacts the biomass with sufficient force to fracture the biomass, such as metallic anvils, hydraulic rams, or other suitable media. Thin biomass sheets are employed to effectively transmit the heat delivered by the heating agents in the pyrolysis unit and to effectively transmit the force applied by the pressure shocks. Pallets are used to contain the biomass during the pressure application. In some cases, the need to contain the biomass in pallets during pyrolysis necessitates a batch treatment for the biomass. Temperature thermocouples (not shown) allow temperature regulation in pyrolysis and cooling compartments.

Unlike pyrolysis processes which produce bio-oil, as for example in a process that pyrolyzes biomass in a fluidized bed and simultaneously produces volatile components and biochar, the biomass fractioning process in compartments 140 produces volatiles and biochar in separate and substantially uncontaminated form. This obviates the need to frequently regenerate catalysts that are used downstream in the conversion of the volatiles to fuel. Furthermore, this separation allows the generation of tar-free biochar. The latter can be readily used as a soil amendment.

The volatiles may comprise any of the products of biomass decomposition from the fractioning process. The basic structural units of biomass can include compounds chosen from the broad groups comprising hemicellulose, cellulose, and lignins. The controlled decomposition of these structural units in the biomass fractioning process leads to a wide range of volatile compounds. Products of hemicellulose fractioning comprise volatiles including, but not limited to: ketones, acids, aldehydes, alcohols, furans and other oxygenates. Products from lignin fractioning include, but are not limited to: guaiacols, syringols, and phenols. Cellulose fractioning yields primarily synthesis gas. These volatiles may be removed via a plurality of pressure stations comprising compartments 140 and compartments 150. The latter stations in particular can be subjected to a negative pressure to assure complete removal of residual volatiles. The emerging volatile compounds are directed to a catalytic column to be thermochemically converted to fuel. The fuel is sent to a heat exchanger or water reservoir to be condensed. Temperatures ranging from 200° C. to 750° C. using a variety of temperature increments are expected in the pyrolysis compartment.

An embodiment of the invention features the pyrolysis chamber as the only chamber between two sliding gate airlocks. Another embodiment features a plurality of chambers, each chamber having multiple stations geared to perform different functions.

The sliding gate airlocks 120, 122 serve to insulate the compartments 130, 140, 150 and 160 from ambient conditions. The pyrolysis compartments, for example, might house an oxygen-starved atmosphere or even vacuum. They might also house an atmosphere containing a supercritical fluid, such as supercritical water, or supercritical methanol. The pressure inside the compartments would accordingly be different, necessitating 80 atm for supercritical methanol, for example. Each sliding gate airlock consists of two gate valves, each valve opening individually but in an alternate manner with respect to the other gate valve. The sliding gates can be controlled pneumatically or electrically. The gate valves of each airlock (120, 122), which directly face the pyrolysis compartments, move in synchrony. Similarly, the gate valves of each airlock that face the ambient environment also move in synchrony. Pressure equalization occurs prior to a sliding gate opening or closing. In the illustrated embodiment, the sliding gates are made of metal; however, they can also be made of wood, plastic or other mechanically strong material.

As indicated above, biomass may be fed into the system in thin sheets on pallets. Biomass can be ground into thin sheets with instruments such as wood hogs, hammer mills, wood chippers horizontal hogs, and vertical hogs. Biomass can be inputted via silos and hoppers utilizing auger feeding in combination with filters including trommel screens, disc screens, oscillating screens, and gravity screeners. Input conveying geometry can be horizontal, inclined, horizontal and inclined, vertical, spiral, as well as swan neck.

Figure 2:
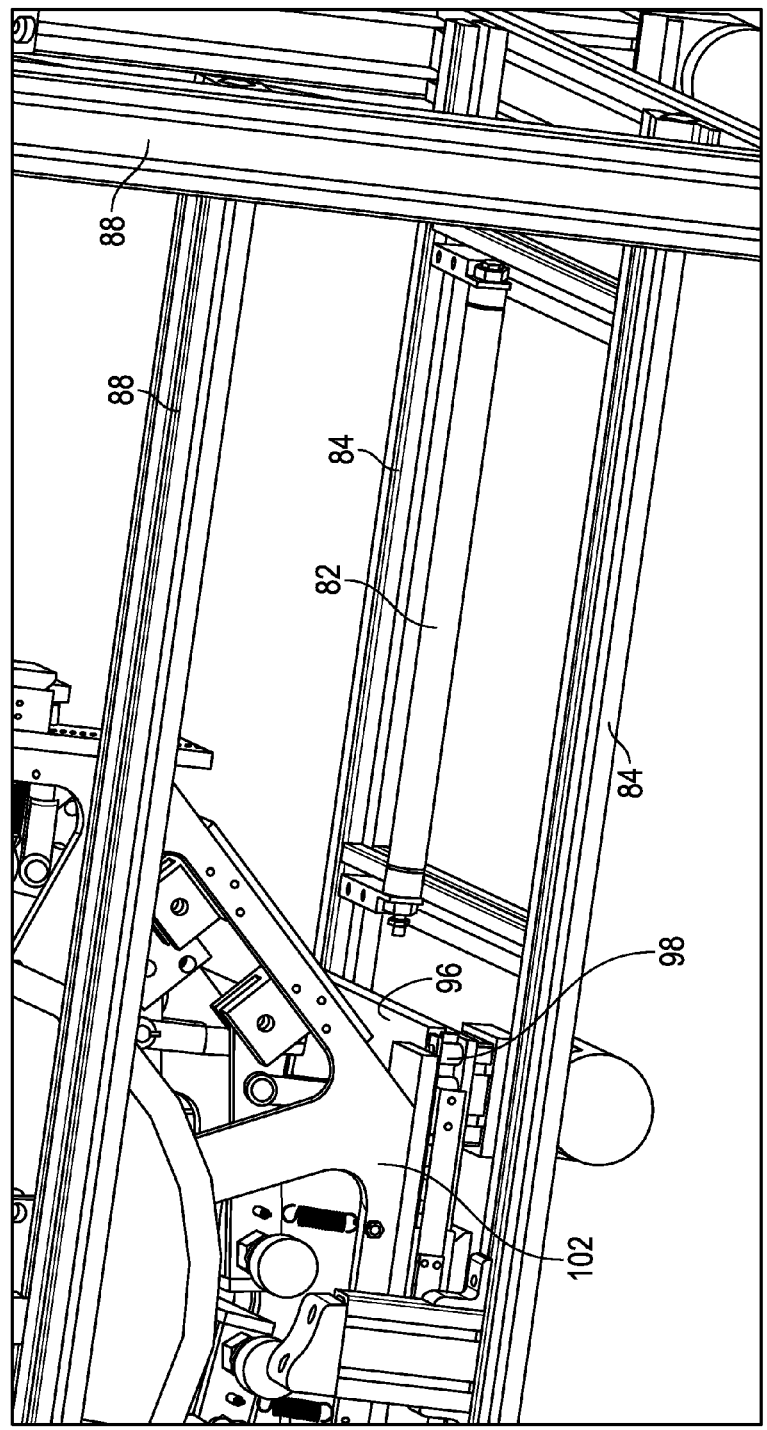
FIG. 2 illustrates an embodiment of the present invention in which a pallet is loaded onto a conveyor from the polygon platform via an air piston.

An embodiment illustrating a disengagement of the pallet from the revolving polygon platform is shown in FIG. 2. When the pallet locked to revolving polygon platform 102 reaches a bottom horizontal position, pneumatically driven air piston 82 is activated and extends to push the pallet out of the polygon platform. The air piston is fixed to guard rails 84 that maintain the pallet confined in the horizontal plane until removal out of the polygon platform via roller chains 98. Structural beams 88 support the feeding system 10.

Figure 3:
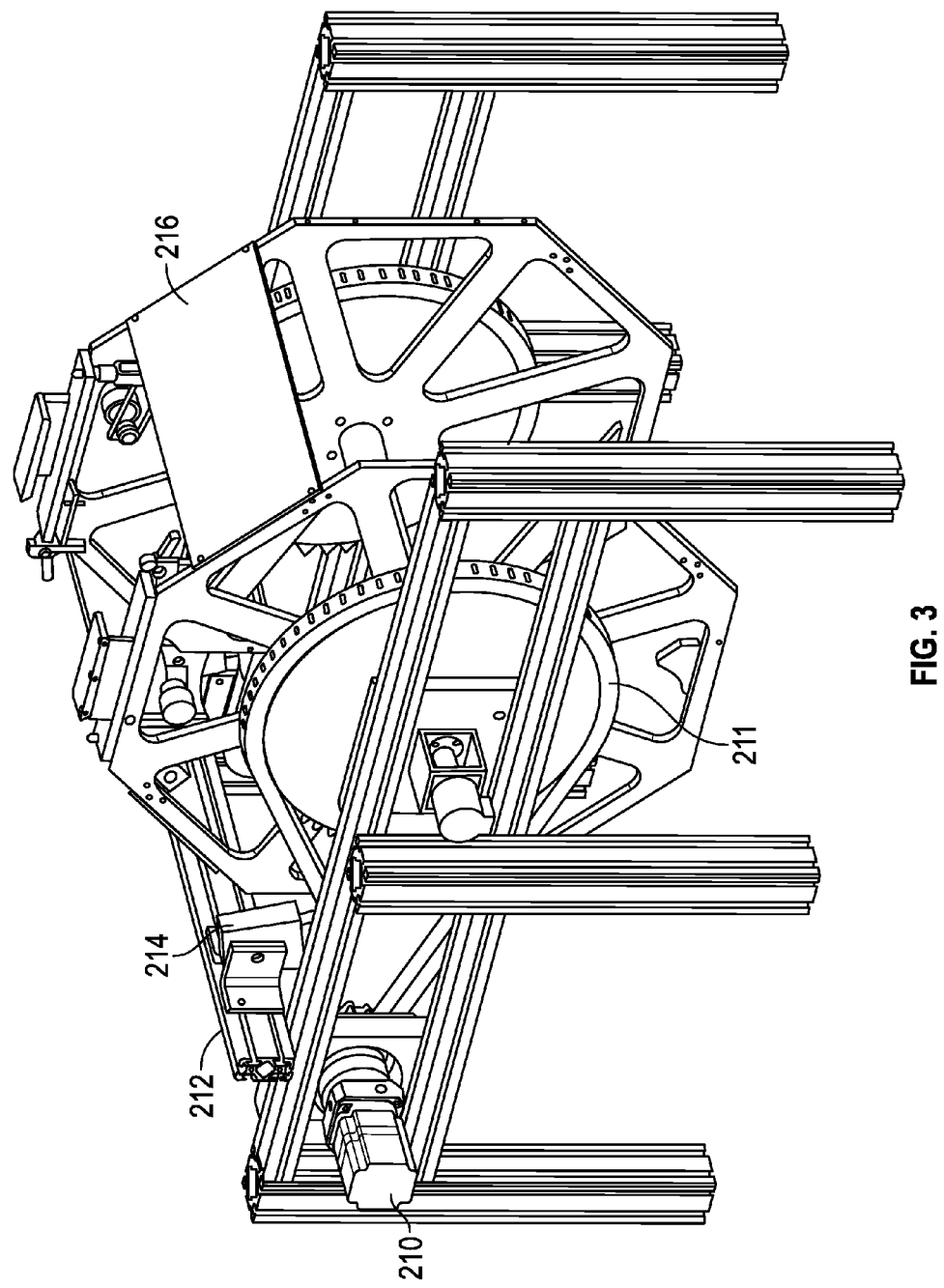
FIG. 3 is a side perspective view of a drive system for the revolving polygon platform of the system for conveying biomass.

FIG. 3 is a perspective view of an embodiment of the polygon platform supported on several metal beams. The polygon platform is driven by motor 210, which contains a sprocket moving roller chain 211. The chain is also wound around a larger sprocket attached to the revolving polygon platform. Tensioner 214 applied to the roller chain is attached to horizontal support bar 212 which rests on the main supporting structure. A blank polygon platform 216 is used for maintaining the polygon platform rigid.

Figure 4:
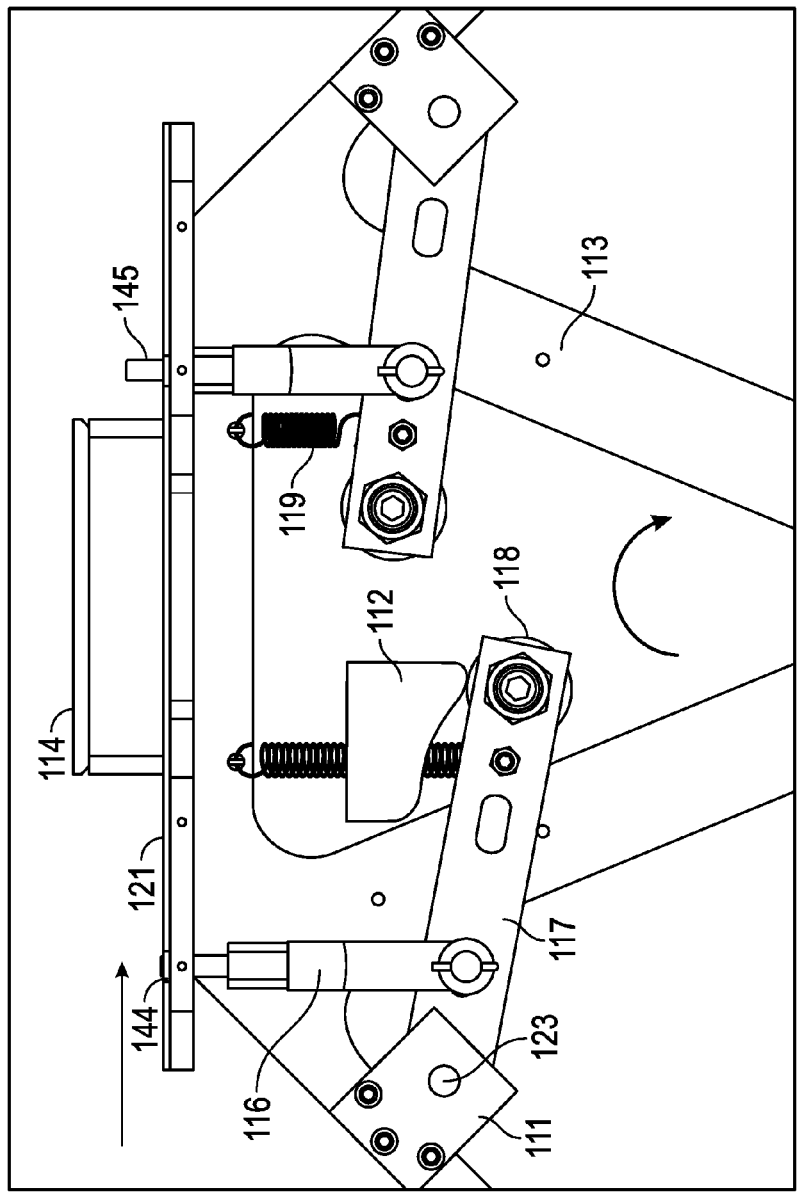
FIG. 4 is a diagram illustrating an embodiment for the initial engagement of a pallet onto a revolving polygon platform after biomass introduction in the present system for conveying biomass.

Once a pallet is transferred to conveyor from the revolving polygon platform a mechanism is employed to securely locate the pallet on the polygon platform. FIG. 4 illustrates an embodiment for accomplishing this function when pallet is engaged onto the top position of polygon platform after biomass introduction. A pallet pushed by an actuated bar or rod is brought into area 115 and partially capped by covering 114 serving to prevent movement in the z direction. At the moment polygon platform 121 reaches a horizontal position, retractable pin 144 is lowered to allow entry of pallet, and retractable pin 145 is raised to prevent further movement of the pallet. This can be accomplished by a spring mechanism comprising arm 117 attached to structure 111 which is fixed to an arm of revolving polygon platform 113. Arm 117 pivots about axis 123 and its deflection via roller guides 112 controls the displacement of fixed pin housing 116, which in turn controls the displacement of pin 144. Arm 117 is additionally stabilized by spring 119, which connects the arm to an arm of revolving polygon platform. When pallet is engaged onto the top of polygon platform after biochar generation, the pallet is pulled rather than pushed by an actuated bar or rod.

Figure 5:
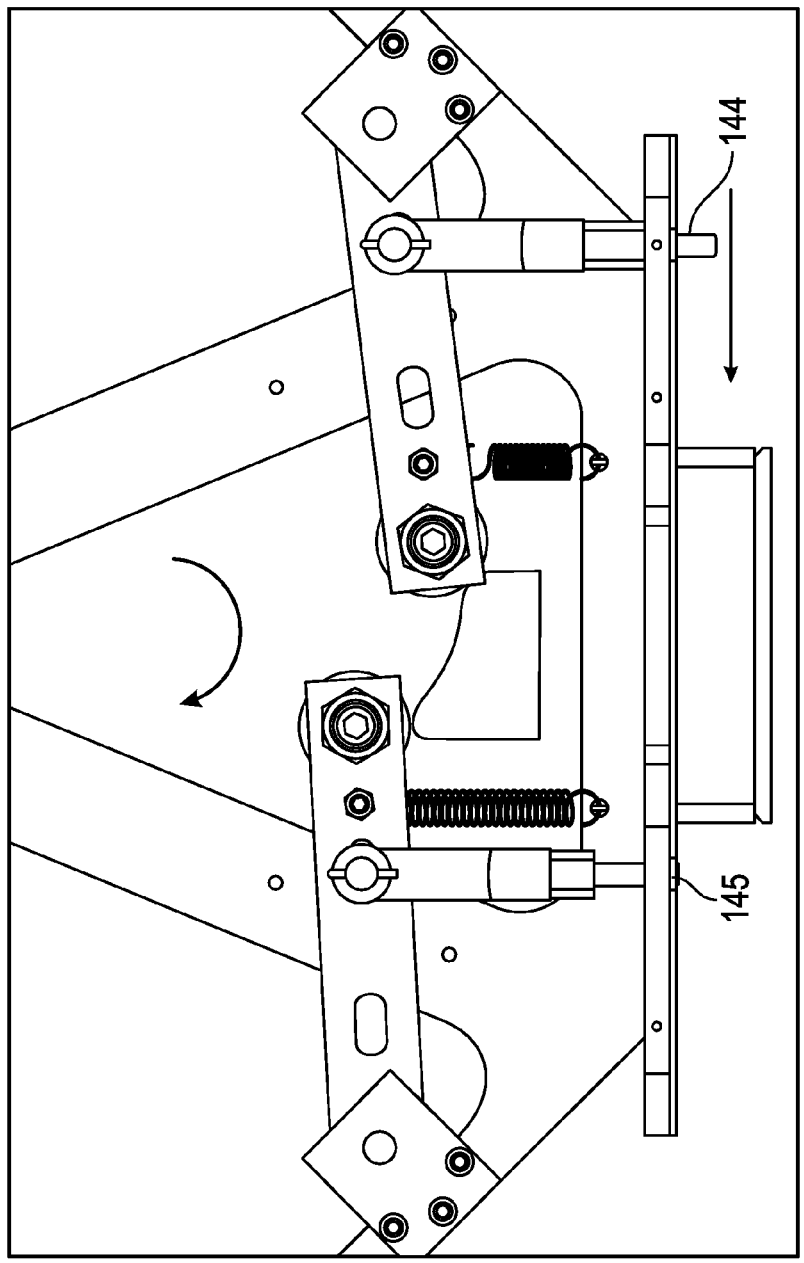
FIG. 5 is a diagram illustrating an embodiment of the present invention showing a disengagement of a pallet from a polygon platform to a conveyor.

As the polygon platform continues to revolve, pin 144 is raised and both pins 144 and 145 remain elevated to restrain pallet lateral movement. This same pin mechanism operates when the pallet approaches a bottom horizontal position, as illustrated in FIG. 5, which shows a pallet, and pin position after the pallet has dumped its biochar. At this point, pin 144 is lowered and pin 145 is in process of being raised to allow ready pallet passage to the revolving polygon platform. Pin control is achieved via arm 117, which encounters the proximate roller guides.

Figure 6:
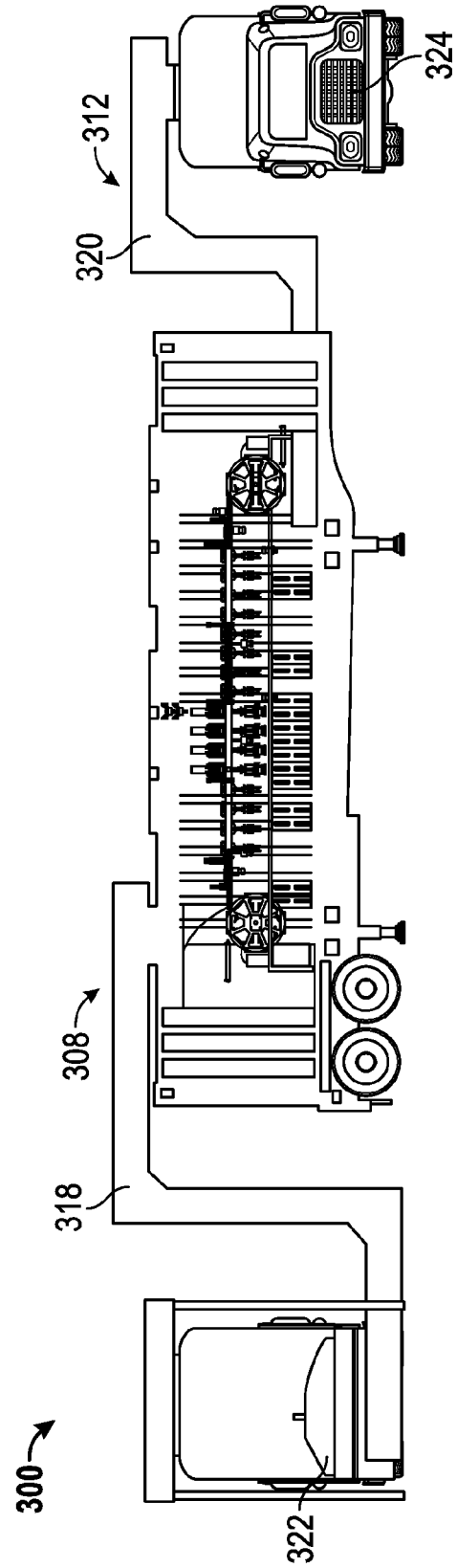
FIG. 6 is a diagram illustrating an embodiment of the system for conveying biomass installed in a trailer and connected to two-bucket systems, which are in turn connected to two cargo trucks.

Embodiments of the invention provide the ability to modularize different components and to locate the entire system in a mobile station such as a trailer. Mobility of equipment is a desired feature of the invention since the costs to transport biomass can be a significant fraction of the cost of fuel conversion. To minimize these transportation costs, the processing equipment can be located in close proximity to biomass sources. FIG. 6 illustrates an embodiment of the present invention inside a moveable trailer 300. In particular, biomass is inputted on one side 308, and biochar is collected on the other side 312 via bucket conveyors 318, 320 connected to hauling trucks 322, 324, respectively. It is estimated that this type of facility operating near a suitable biomass source can produce around 200,000 gallons of gasoline per year operating on a 24/7 schedule. This facility can be easily replicated to produce substantial more amounts of gasoline to meet the nation's energy needs.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
    means for conveying biomass through a pyrolysis chamber, the conveying means comprising drying means, pyrolysis means and means for removing pyrolysis gas and biochar, whereby biomass is introduced via a first revolving polygon platform and biochar resulting from pyrolysis is removed via a second revolving polygon platform;
    means for transferring biomass from the first revolving polygon platform onto the means for conveying, the means for conveying comprising a conveyor having the pyrolysis chamber and a means for transferring biochar from the conveyor to the second revolving polygon platform.

2. The system of claim 1, wherein biomass is transferred at atmospheric pressure into the pyrolysis chamber at a negative or positive pressure relative to atmospheric pressure.

3. The system of claim 1, wherein biomass is placed as thin sheets on pallets.

4. The system of claim 1, wherein a polygon of the polygon platform comprises N sides, where N is a number from 3 to 1000.

5. The system of claim 1, wherein the revolving polygon platforms are synchronized to process material in a semi-continuous manner.

6. The system of claim 2, wherein positive pressure is attained via the presence of an inert gas.

7. The system of claim 6, wherein the inert gas is at least one of: carbon dioxide, argon, nitrogen, helium.

8. The system of claim 1, further comprising a compartment in the conveyor including a plurality of stations for drying biomass.

9. The system of claim 1, further comprising a compartment in the conveyor including a plurality of stations which pyrolyze biomass.

10. The system of claim 1, further comprising a compartment in the conveyor a plurality of stations which produce synthesis gas.

11. The system of claim 1, further comprising a compartment in the conveyor including a plurality of stations which remove residual gases.

12. The system of claim 1, further comprising a series of compartments in the conveyor including a plurality of stations which cool the biomass.

13. The system of claim 1, further comprising a series of compartments in the conveyor which sequentially dry the biomass, pyrolyze the biomass, remove volatile gases, and cool the biomass.

14. The system of claim 1, wherein the system is adapted to fit within a mobile trailer.

15. A system for pyrolysis and gasification of biomass, comprising:
   means for conveying biomass through a pyrolysis chamber, whereby biomass is introduced via a first revolving polygon platform, and biochar and volatile components resulting from the pyrolysis are removed via a second revolving polygon platform;
   means for transferring biomass from the first revolving polygon platform onto the means for conveying, the means for conveying comprising a conveyor containing the pyrolysis chamber and a means for transferring biochar from the conveyor to the second revolving polygon platform; and
   means for transferring biomass at atmospheric pressure onto the pyrolysis chamber at a negative or positive pressure relative to atmospheric pressure via a sliding gate airlock system.

16. The system of claim 15, wherein the pyrolysis is performed using ramps of temperature and pressure shocks.

17. The system of claim 15, wherein biomass is placed as thin sheets on pallets, which are moved on a rail system.

18. The system of claim 16, wherein the pressure shocks are administered via metallic anvils.

19. The system of claim 15, wherein the revolving polygon platforms are synchronized to process material in a semi-continuous manner.

* * * * *